(12) United States Patent
Taniguchi et al.

(10) Patent No.: US 10,926,482 B2
(45) Date of Patent: Feb. 23, 2021

(54) WELDING DEVICE AND WELDING METHOD

(71) Applicant: DENSO CORPORATION, Kariya (JP)

(72) Inventors: Kouta Taniguchi, Kariya (JP); Naoto Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 121 days.

(21) Appl. No.: 16/071,913

(22) PCT Filed: Jan. 7, 2017

(86) PCT No.: PCT/JP2017/000353
§ 371 (c)(1),
(2) Date: Jul. 23, 2018

(87) PCT Pub. No.: WO2017/130667
PCT Pub. Date: Aug. 3, 2017

(65) Prior Publication Data
US 2019/0030831 A1    Jan. 31, 2019

(30) Foreign Application Priority Data
Jan. 25, 2016    (JP) .............................. JP2016-011742

(51) Int. Cl.
*B29C 65/70* (2006.01)
*B29C 65/18* (2006.01)
(Continued)

(52) U.S. Cl.
CPC .............. *B29C 65/70* (2013.01); *B29C 65/18* (2013.01); *B29C 65/30* (2013.01); *B29C 65/568* (2013.01);
(Continued)

(58) Field of Classification Search
CPC ..... B29C 65/02; B29C 65/18; B29C 65/7814; B29C 65/782; B29C 65/7805;
(Continued)

(56) References Cited

U.S. PATENT DOCUMENTS 2,819,209 A * 1/1958 Pall .................... B01D 39/1661
210/510.1
2008/0141637 A1* 6/2008 Hirata ................ B01D 46/0005
55/497

(Continued)

FOREIGN PATENT DOCUMENTS

JP         11111381 A   *  4/1999
JP       2015189028 A     11/2015

*Primary Examiner* — Michael N Orlando
*Assistant Examiner* — Abhishek A Patwardhan
(74) *Attorney, Agent, or Firm* — Harness, Dickey & Pierce, P.L.C.

(57) ABSTRACT

The welding chip heats and melts the first welded part and the second welded part, and includes a projected part, a first extension part, and a second extension part. The projected part has a tubular shape with a bottom. One end of the tubular shape extending in a predetermined direction opens and the other end of the tubular shape is closed. The projected part is pushed into the first welded part and the second welded part in the predetermined direction from the opening one end of the tubular shape. The first extension part has a shape extending from a tube outer surface of the projected part and extending annularly around the predetermined direction. The second extension part has a shape extending from the first extension part to the opening one end of the projected part in the predetermined direction and extending annularly around the predetermined direction.

3 Claims, 9 Drawing Sheets

(51) Int. Cl.
B29C 65/56 (2006.01)
B29C 65/00 (2006.01)
B29C 65/30 (2006.01)
B29L 31/00 (2006.01)
F02F 1/24 (2006.01)

(52) U.S. Cl.
CPC ........ *B29C 66/326* (2013.01); *B29C 66/3494* (2013.01); *B29C 66/474* (2013.01); *B29C 66/71* (2013.01); *B29C 66/73921* (2013.01); *B29C 66/742* (2013.01); *B29C 66/81422* (2013.01); *B29C 66/81423* (2013.01); *B29C 66/81425* (2013.01); *B29C 66/81811* (2013.01); *B29C 66/8322* (2013.01); *B29L 2031/7172* (2013.01); *B29L 2031/749* (2013.01); *F02F 1/24* (2013.01)

(58) Field of Classification Search
CPC . B29C 65/7808; B29C 65/7802; B29C 65/78; B29C 65/7461; B29C 65/7451; B29C 65/7441; B29C 65/72; B29C 65/74; B29C 65/7841; B29C 65/7844; B29C 66/73921; B29C 66/81431; B29C 66/832; B29C 66/8322; B29C 66/112; B29C 66/114; B29C 66/137; B29C 66/21; B29C 66/53461; B29C 66/542; B29C 66/1122; B29C 66/81423; B29C 66/1142; B29C 65/70; B29C 65/568; B29C 66/3494; B29C 66/474; B29C 66/326; B29C 66/81811; B29C 65/30; B29C 66/71; B29C 66/742; B29C 66/81422; B29C 66/81425; B29L 2031/3055; B29L 2031/3481; B29L 2031/7172; B29L 2031/749; F02F 1/24
USPC ....................................... 156/245
See application file for complete search history.

(56) References Cited

U.S. PATENT DOCUMENTS

2013/0112336 A1* 5/2013 Robin .................... B29C 65/08
156/73.1
2017/0100882 A1* 4/2017 Saito ...................... B29C 65/20

* cited by examiner

WELDING DEVICE AND WELDING METHOD

CROSS REFERENCE TO RELATED APPLICATIONS

This application is a U.S. National Phase Application under 35 U.S.C. 371 of International Application No. PCT/JP2017/000353 filed on Jan. 7, 2017 and published in Japanese as WO 2017/130667 A1 on Aug. 3, 2017. This application is based on and claims the benefit of priority from Japanese Patent Application No. 2016-011742 filed on Jan. 25, 2016. The entire disclosures of all of the above applications are incorporated herein by reference.

TECHNICAL FIELD

The present disclosure relates to a welding device and a welding method which join resin molded articles by welding.

BACKGROUND ART

The welding device described in Patent Document 1 includes a welding chip that heats and melts a molded article made of a resin. This molding chip has a projected part having a bottomed tubular shape, and melts a portion in contact with the projected part out of the molded article by pushing in the projected part having a high temperature to the molded article from the tube opening side. By cooling and solidifying the molten portion thereafter, the portion where the projected part has been pushed in out of the molded article is welded and joined.

PRIOR ART DOCUMENT

Patent Document

Patent Document 1: JP 2015-189028 A

In the meantime, the present inventors found out that following problems occurred when a molded article $21x$ made of a resin was welded using a welding chip $90x$ shown in FIG. 17. That is, when a projected part $92x$ having a bottomed tubular shape is pushed in to the molded article $21x$, a heated portion of the tube inner surface of the projected part $92x$ and a heated portion of the tube outer surface out of the molded article $21x$ are molten. Also, accompanying pushing in of the projected part $92x$ to the molded article $21x$, the inside of the tube comes to be filled with a molten resin $60ax$. When the resin is molten further in this filled state, a molten resin $64x$ outside the tube sharply increases. When such molten resin $64x$ outside the tube is cooled and solidified, the molten resin $64x$ comes to be formed as a welding burr.

With respect to the issue, the present inventors further studied the possibility of arranging an extension part $93x$ shown by a single-dot chain line of FIG. 7 to the welding chip $90x$. This extension part $93x$ extends from the tube outer surface of the projected part $92x$, and has an annular shape extending around the tube axis of the projected part $92x$. With this configuration, the molten resin $64x$ that increases outside the tube comes to be pressed to the molded article $21x$ by extension part $93x$, and such event can be suppressed that the welding burr comes to have a shape of floating from the molded article $21x$ (the shape shown in FIG. 17). Therefore, such risk can be reduced that the welding burr peels off in using the molded article and various troubles are caused.

However, the molten resin $64x$ does not increase evenly over the entire peripheral direction outside the tube, and often tends to increase locally. In this case, there is a risk that the molten resin $64x$ comes to have a locally long shape and runs off from the extension part $93x$. Because the molten resin $64x$ of a portion running off from the extension part $93x$ is liable to have a shape of floating from the molded article $21x$, the risk of peeling off of the welding burr cannot be sufficiently reduced. Particularly, when the push-in amount of the projected part $92x$ is increased with a purpose of improving the welding strength, sharp increase of the molten resin $64x$ outside the tube becomes noticeable, therefore such portion becomes large that runs off from the extension part $93x$ and comes to have a shape of floating from the molded article $21x$, and the risk of peeling off of the welding burr increases.

SUMMARY OF INVENTION

The present disclosure addresses the above issues. Thus, it is an objective of the present disclosure to provide a welding device and a welding method which achieve both of increase of the push-in amount of the welding chip to improve the welding strength and suppression of peeling off of the welding burr.

To achieve the objective, in a first aspect of the present disclosure, a welding device for joining together a first molded article made of resin and a second molded article made of resin by welding includes a welding chip that comes into contact with both a first welded part of the first molded article and a second welded part of the second molded article. The second welded part is adjacent to the first welded part. The welding chip heats and melts the first welded part and the second welded part, and includes a projected part, a first extension part, and a second extension part. The projected part has a tubular shape with a bottom. One end of the tubular shape extending in a predetermined direction opens and the other end of the tubular shape is closed. The projected part is pushed into the first welded part and the second welded part in the predetermined direction from the opening one end of the tubular shape. The first extension part has a shape extending from a tube outer surface of the projected part and extending annularly around the predetermined direction. The second extension part has a shape extending from the first extension part to the opening one end of the projected part in the predetermined direction and extending annularly around the predetermined direction.

Basically, the welding chip in the first aspect includes a projected part, a first extension part, and a second extension part. The projected part has a tubular shape with a bottom. The projected part is pushed into the first welded part and the second welded part in the predetermined direction from the opening one end of the tubular shape. The first extension part has a shape extending from a tube outer surface of the projected part and extending annularly around the predetermined direction. The second extension part has a shape extending from the first extension part to the opening one end of the projected part in the predetermined direction and extending annularly around the predetermined direction.

Therefore, when the projected part is pushed in to the first welded part and the second welded part from the tube opening side, the inside of the tube of the projected part is filled with the molten resin. When the projected part is pushed in further in this filled state, the molten resin outside the tube sharply increases. Also, with respect to the molten resin outside the tube which sharply increases thus, the direction of sharply increasing and extending is restricted by the first extension part. As a result, the molten resin sharply increasing and extending outside the tube comes to be pressed by the first extension part toward the first molded article and the second molded article, and can be suppressed from becoming the welding burr having a shape of floating from the first molded article and the second molded article.

Also, when the amount of the molten resin outside the tube is much, such event is concerned that the molten resin moves along the first extension part and runs off from the first extension part. With respect to such concern, according to the aspect described above, the movement of the molten resin outside the tube in the direction along the first extension part is restricted by the second extension part, and the molten resin outside the tube is promoted to move toward the first molded article and the second molded article. Therefore, the molten resin 63 outside the tube moving along the first extension part 93 is pressed by the first molded article and the second molded article, and can be therefore suppressed from running off from the first extension part and becoming a welding burr having a shape of floating from the first molded article and the second molded article.

Accordingly, in the first aspect, both of increase of the push-in amount of the welding chip to improve the welding strength and suppression of peeling off of the welding burr can be achieved.

To achieve the objective, a welding method in a second aspect of the present disclosure is for joining together by welding a first molded article made of resin and a second molded article made of resin by heating and melting both a first welded part of the first molded article and a second welded part of the second molded article by a welding chip. The second welded part is adjacent to the first welded part. The welding chip includes a projected part, a first extension part, and a second extension part. The projected part has a tubular shape with a bottom. One end of the tubular shape extending in a predetermined direction opens and the other end of the tubular shape is closed. The first extension part has a shape extending from a tube outer surface of the projected part and extending annularly around the predetermined direction. The second extension part has a shape extending from the first extension part to the opening one end of the projected part in the predetermined direction and extending annularly around the predetermined direction. According to the welding method, an arrangement procedure is performed, in which the first molded article and the second molded article are arranged so that the first welded part and the second welded part are adjacent to each other. Moreover, a push-in procedure is performed, in which the projected part is pushed into the first welded part and the second welded part in the predetermined direction from the opening one end of the tubular shape after the arrangement procedure. Furthermore, a heating melt procedure is performed, in which a state where the projected part is pushed in by a predetermined amount, and a state where the first welded part and the second welded part are heated and molten by the welding chip are maintained for a predetermined time. In addition, a cooling solidification procedure is performed, in which the first welded part and the second welded part are cooled and solidified after the heating melt procedure.

Basically, the push-in procedure and the heating melt procedure in the second aspect use the welding chip that includes the projected part, the first extension part, and the second extension part. Therefore, in the push-in procedure and the heating melt procedure, with respect to the molten resin sharply increasing outside the tube of the projected part, the direction of sharply increasing and extending is restricted by the first extension part. As a result, the molten resin sharply increasing and extending outside the tube comes to be pressed by the first extension part toward the first molded article and the second molded article, and can be suppressed from becoming the welding burr having a shape of floating from the first molded article and the second molded article.

Also, when the amount of the molten resin outside the tube is much, such event is concerned that the molten resin moves along the first extension part and runs off from the first extension part. With respect to such concern, according to the aspect described above, the movement of the molten resin outside the tube in the direction along the first extension part is restricted by the second extension part, and the molten resin outside the tube is promoted to move toward the first molded article and the second molded article. Therefore, the molten resin outside the tube is pressed between the first molded article and the second molded article and the first extension part, and can be therefore suppressed from running off from the first extension part and becoming a welding burr having a shape of floating from the first molded article and the second molded article.

Accordingly, in the second aspect, both of increase of the push-in amount of the welding chip to improve the welding strength and suppression of peeling off of the welding burr can be achieved.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
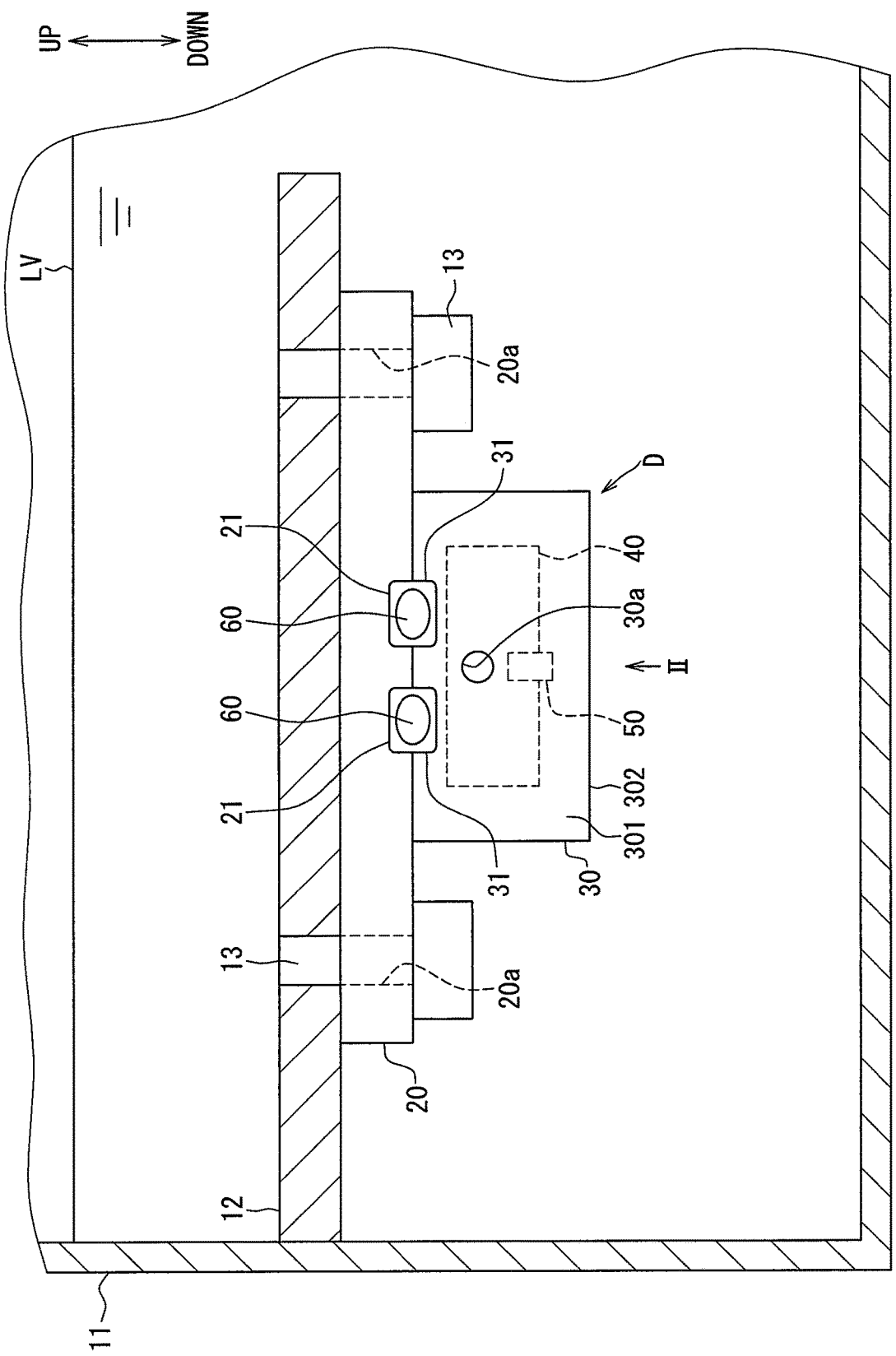
FIG. 1 is a cross-sectional view that schematically shows a state in which a liquid surface detection device manufactured by a welding device and a welding method related to a first embodiment is mounted on a vehicle.
Figure 2:
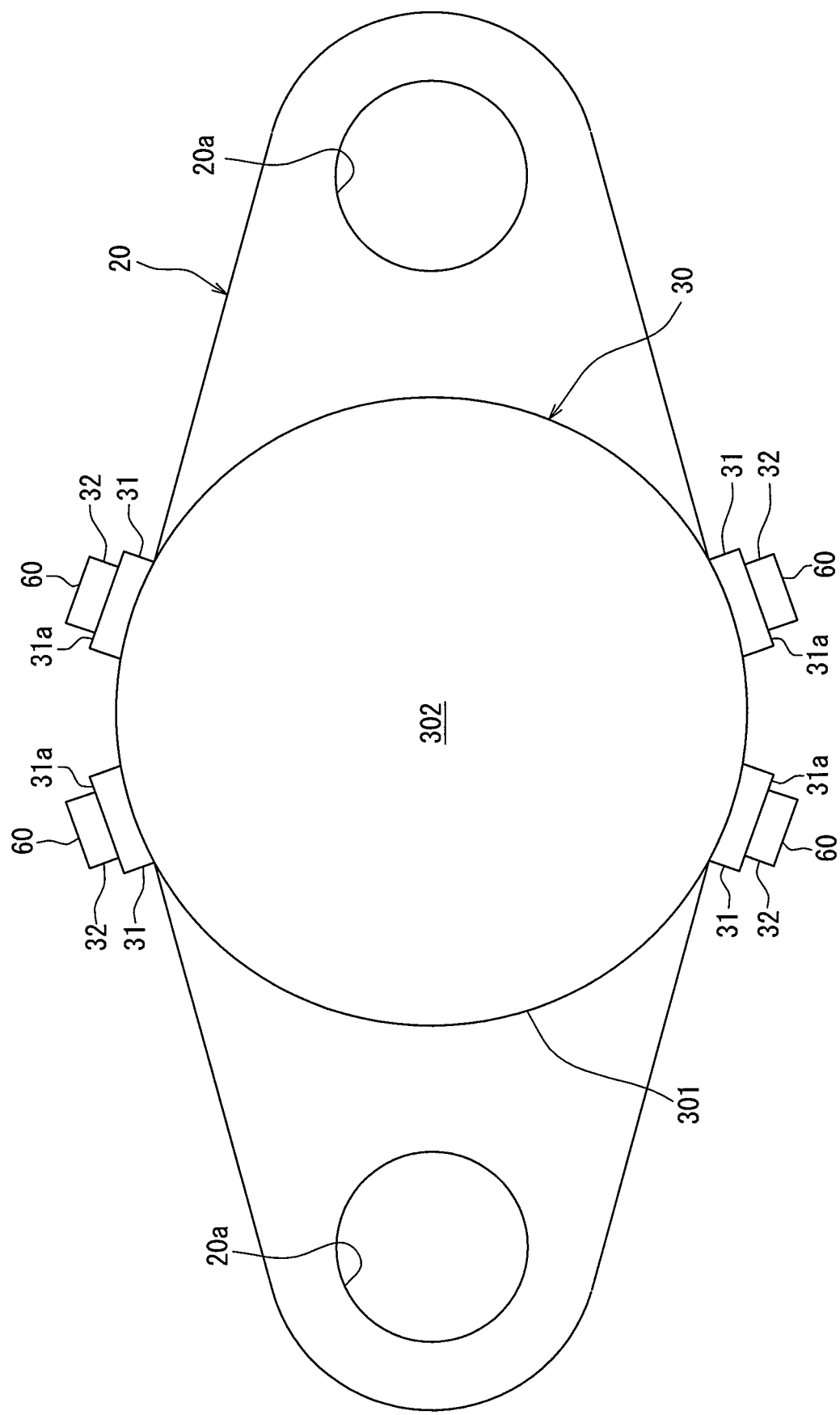
FIG. 2 is a drawing as viewed along the arrow II of FIG. 1.

Below, embodiments will be explained referring to the drawings. In each embodiment, there is a case a same reference sign is given to a portion corresponding to an item having been explained in a preceding embodiment and duplicated explanation thereof is omitted. In each embodiment, when only a part of a configuration is explained, with respect to the other portions of the configuration, other embodiments explained previously can be referred to and applied.

First Embodiment

A liquid surface detection device D shown in FIG. 1 is mounted on a vehicle, and detects the liquid surface level LV of a lubrication oil. This lubrication oil is used for an internal combustion engine mounted on the vehicle, and is stored in an oil pan 11 that is attached to the lower part of a cylinder block configuring the internal combustion engine. An arrow mark showing the vertical direction in the drawing shows the vertical direction of the liquid surface detection device D in a state of being mounted on the vehicle. To the inner surface of the oil pan 11, a cantilever 12 made of metal extended in the vertical direction is attached. The liquid surface detection device D is fixed to the cantilever 12 by bolts 13.

When the liquid surface level LV of the lubrication oil within the oil pan 11 becomes a predetermined level or below, the liquid surface detection device D outputs a detection signal. For example, when the detection signal is outputted from the liquid surface detection device D, a display device arranged within a cabin of a vehicle displays an alarm indicating shortage of the storage amount of the lubrication oil.

As shown in FIG. 1, the liquid surface detection device D includes a body 20, a cover 30, a float 40, and a detection component 50. The body 20, the cover 30, and the float 40 are made of a resin, and a thermoplastic resin is used for the body 20 and the cover 30 in particular. The body 20 has a plate shape where bolt holes 20a are formed, and is fixed to the cantilever 12 by the bolts 13 that are inserted to the bolt holes 20a. Also, the body 20 is positioned below the cantilever 12, and the cover 30 is positioned below the body 20.

The cover 30 has a bottomed cylindrical shape, and includes a cylindrical part 301 of a cylindrical shape and a bottom part 302 that closes the lower end of the cylindrical part 301. The upper end of the cylindrical part 301 is closed by the body 20, and the float 40 is arranged in a storage chamber that is surrounded by the cover 30 and the body 20. The float 40 is arranged so as to be movable within a predetermined range in the vertical direction within the storage chamber.

A through hole 30a is formed in the cylindrical part 301, and the lubrication oil flows into or flows out from the storage chamber through this through hole 30a. Therefore, when the liquid surface level LV of the lubrication oil stored in the oil pan 11 is positioned at the position shown in FIG. 1 namely above the storage chamber, the storage chamber is filled with the lubrication oil, and the float 40 is positioned at the uppermost part of the predetermined range. When the liquid surface level LV of the lubrication oil stored in the oil pan 11 lowers from the position of the through hole 30a, the liquid surface level of the lubrication oil of the storage chamber lowers to the position of the through hole 30a, and the position of the float 40 also lowers. In the explanation below, the position of the float 40 in a state in which the lubrication oil lowers to the position of the through hole 30a is called a lower limit position.

The detection component 50 detects whether or not the position in the vertical direction of the float 40 is the lower limit position or below. The detection component 50 is a non-contact type element, and detects the strength of the magnetic field caused by a magnet not illustrated attached to the float 40 for example. In other words, the detection component 50 is arranged so that detected magnetic field strength exceeds a threshold value when the float 40 is positioned at the lower limit position or below. The detection component 50 may output an ON-signal when the detected magnetic field strength exceeds the threshold value, and may output an analog signal according to the detected magnetic field strength. When the analog signal is to be outputted, it is also possible that whether or not the magnetic field strength has exceeded the threshold value is determined by a circuit component not illustrated and the circuit component outputs an ON-signal when it is determined to have exceeded the threshold value.

Thus, because the change in the liquid surface level LV causes the change in the magnetic field by the magnet attached to the float 40 and the detection component 50 converts the change in the magnetic field to an electric signal and outputs the same, the residual quantity of the lubrication oil within the oil pan 11 can be detected.

As shown in FIG. 1, FIG. 2, FIG. 3, and FIG. 4, seats 31 are formed in the cylindrical part 301 of the cover 30, the seats 31 having a shape of protruding in the radial direction from the outer peripheral surface of the cylindrical part 301. On protruding end surfaces 31a of the seats 31, welded parts 32 are formed, the welded parts 32 having a shape of protruding in the radial direction of the cylindrical part 301. The welded part 32 partly protrudes from the center of the protruding end surface 31a. In other words, the seat 31 and the welded part 32 are formed into a shape having a step shown in FIG. 2. The seats 31 are formed at plural positions of the cylindrical part 301, and the welded part 32 is formed on each of the seats 31. The welded part 32 and the seat 31 are molded from a resin integrally with the cylindrical part 301.

Figure 3:
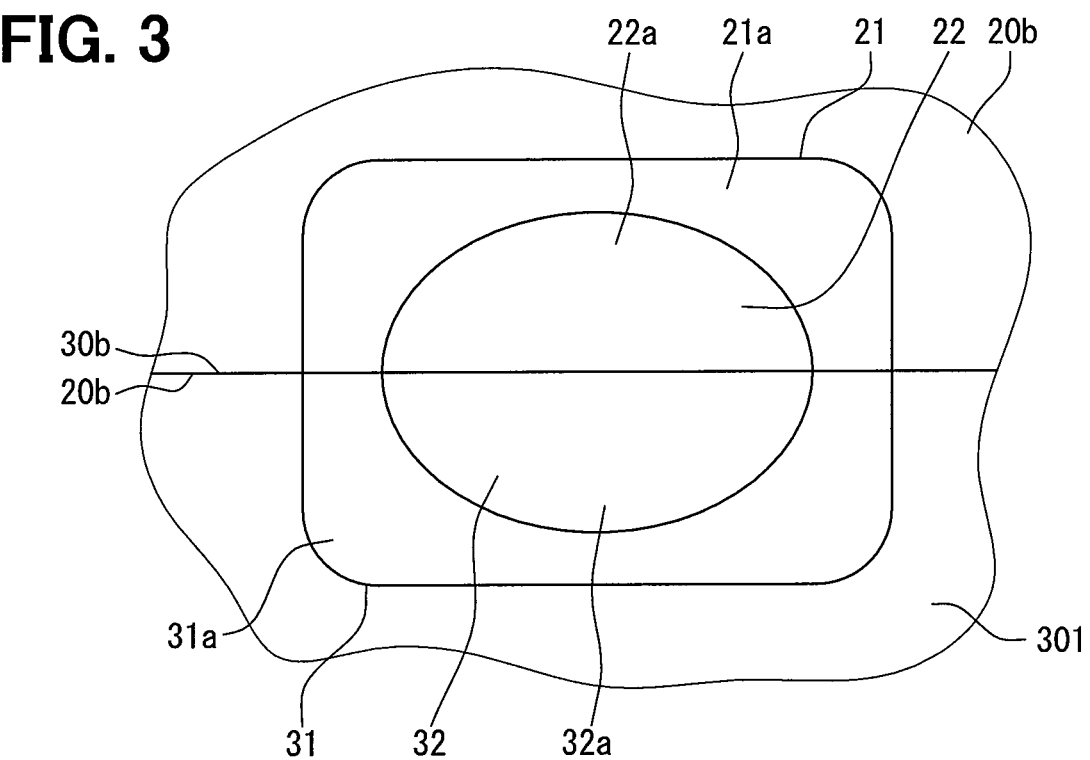
FIG. 3 is an enlarged view of the first welded part and the second welded part shown in FIG. 1, and is a drawing that shows a state before welding.
Figure 4:
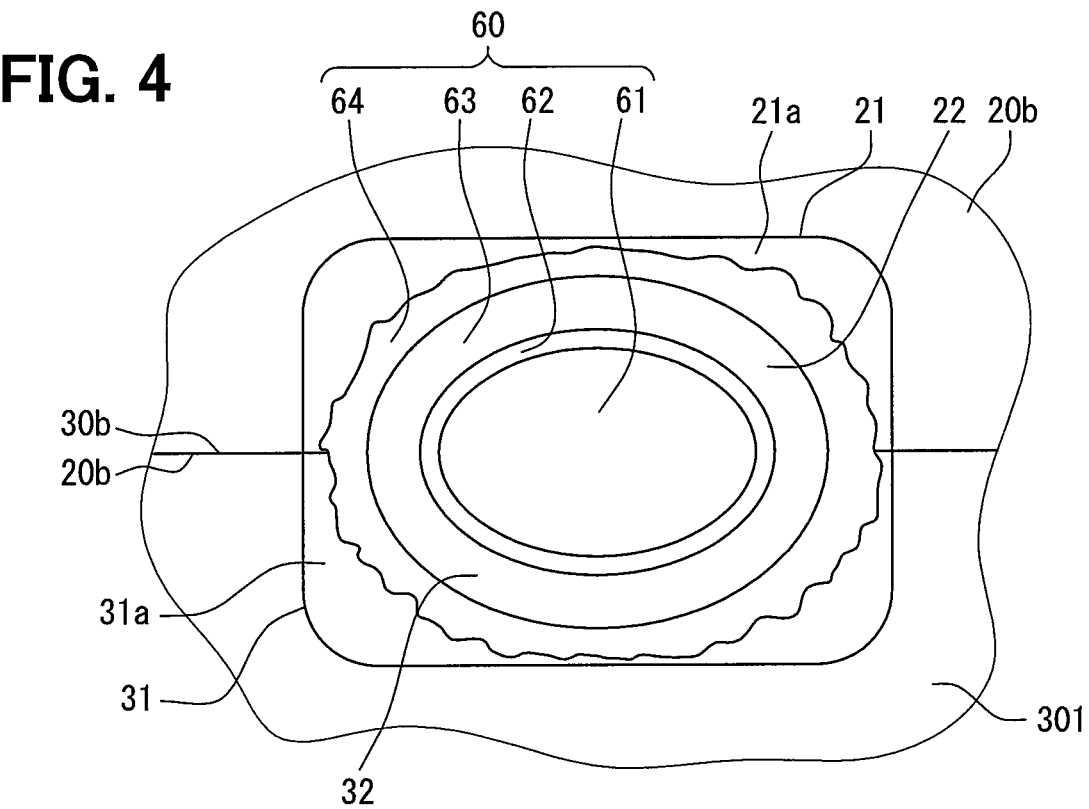
FIG. 4 is an enlarged view of the first welded part and the second welded part shown in FIG. 1, and is a drawing that shows a state after welding.

As shown in FIG. 1, FIG. 3, and FIG. 4, in the body 20, seats 21 are formed to have a shape of protruding from a side surface 20b of the body 20. On a protruding end surface 21a of the seat 21, a welded part 22 is formed to have a shape of further protruding in the same direction of the protruding direction of the seat 21. The welded part 22 protrudes partly from the center of the protruding end surface 21a. In other words, the seat 21 and the welded part 22 are formed into a shape having a step similar to that of the welded part 32 and the seat 31 of the cover 30. The seats 21 are formed at plural positions of the side surface 20b of the body 20, and the welded part 22 is formed on each of the seats 21. The welded part 22 and the seat 21 are molded from a resin integrally with the body 20.

Also, the body 20 and the welded part 22 that is formed in the body 20 are equivalent to "the first molded article" and "the first welded part". The cover 30 and the welded part 32 that is formed in the cover 30 are equivalent to "the second molded article" and "the second welded part". Further, as shown in FIG. 3, the body 20 and the cover 30 are arranged so that the side surface 20b of the cover 20 and the side surface 30b of the cover 30 come into surface-contact with each other. In a state of this arrangement, the side surfaces of the welded parts 22, 32 also are in surface-contact with each other, and the welded parts 22, 32 are welded to each other. In other words, as shown in FIG. 4, a molten and solidified part 60 is formed on the surface of the welded parts 22, 32, which the molten and solidified part is obtained by cooling and solidification in a state of being heated and molten to be integrated. The welded parts 22, 32 are joined by welding, and thereby the cover 30 is fixed to the body 20.

Figure 5:
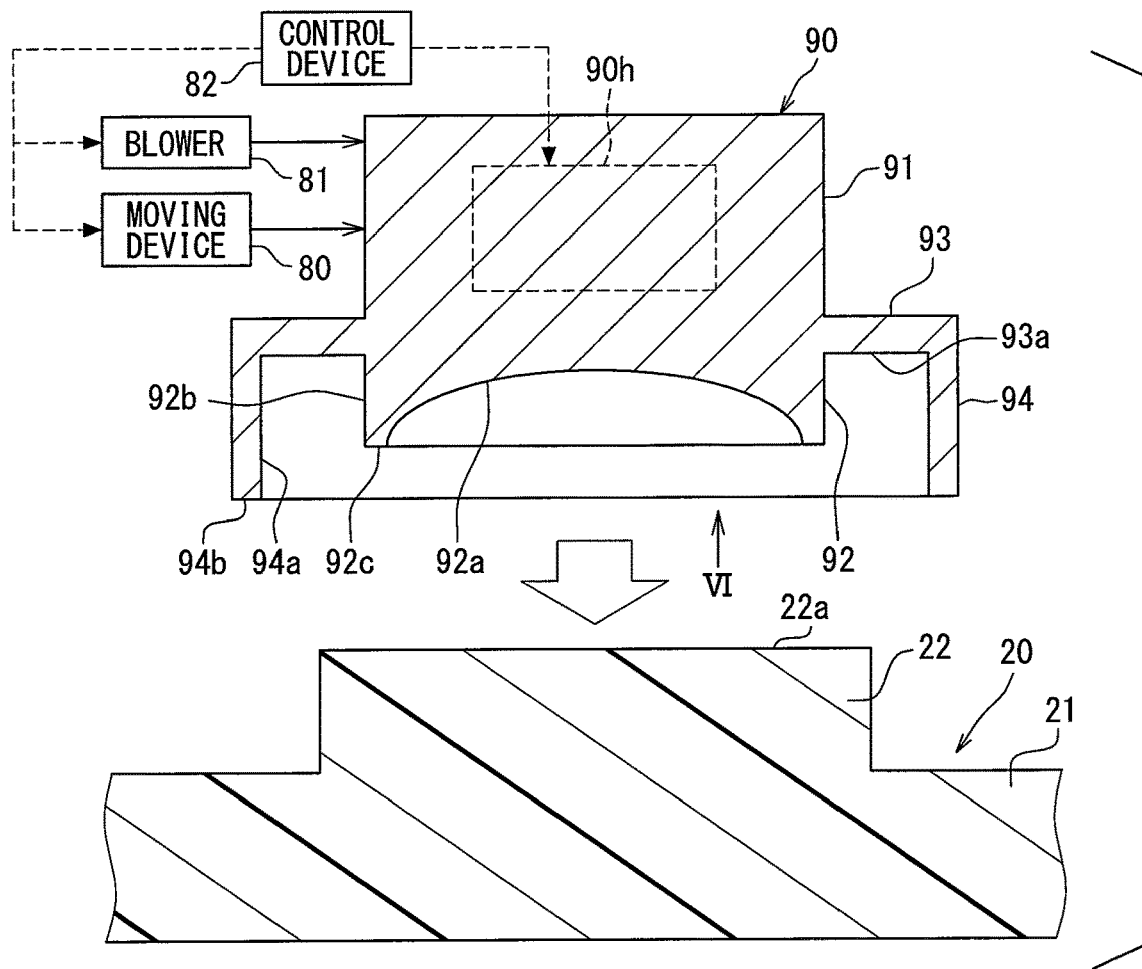
FIG. 5 is a cross-sectional view that schematically shows the welding device and the welded part related to the first embodiment.

The welded parts 22, 32 are heated and molten by pressing a welding chip 90 shown in FIG. 5, and are thereafter cooled and solidified to form the molten and solidified part 60, and the welded parts 22, 32 are thereby joined with each other. Therefore, the molten and solidified part 60 is formed into a shape having unevenness along the pressing surface of the welding chip 90.

A welding device includes the welding chip 90, a moving device 80, a blower 81, and a control device 82. The welding chip 90 is made of metal with an electric heater 90h being attached to the inside of the welding chip 90. The hot welding chip 90 having been heated by the electric heater 90h comes into contact with the welded parts 22, 32, and thereby melts the welded parts 22, 32.

The moving device 80 moves the welding chip 90 by modes of three kinds of a press moving mode, a press retaining mode, and a removal moving mode which will be explained below. In the press moving mode, the welding chip 90 is moved to one side of a predetermined direction (the lower side of FIG. 5), and the hot welding chip 90 is made come into contact with the welded parts 22, 32. Thereafter, the welding chip 90 in a contact state is moved further to one side of the predetermined direction, and the welding chip 90 is pushed in to the welded parts 22, 32. In the press retaining mode, a state in which the welding chip 90 is moved to one side of the predetermined direction by a portion of a predetermined stroke set beforehand and is stopped, namely a state in which the welding chip 90 is pushed in to the welded parts 22, 32 by a predetermined amount, is maintained for a predetermined time. In the removal moving mode, the welding chip 90 is moved to the other side of the predetermined direction (the upper side of FIG. 5), and the welding chip 90 is removed from the welded parts 22, 32.

The blower 81 blows the air to a blowing passage not illustrated formed inside the welding chip 90. In concrete terms, the air is made flow in from a flow-in port of the blowing passage, and the air is made flow out from a flow-out port of the blowing passage. Therefore, when the blower 81 is operated in a state heating by the electric heater 90h is stopped, temperature drop of the welding chip 90 can be promoted. The control device 82 controls operation of the moving device 80, the blower 81, and the electric heater 90h.

Figure 6:
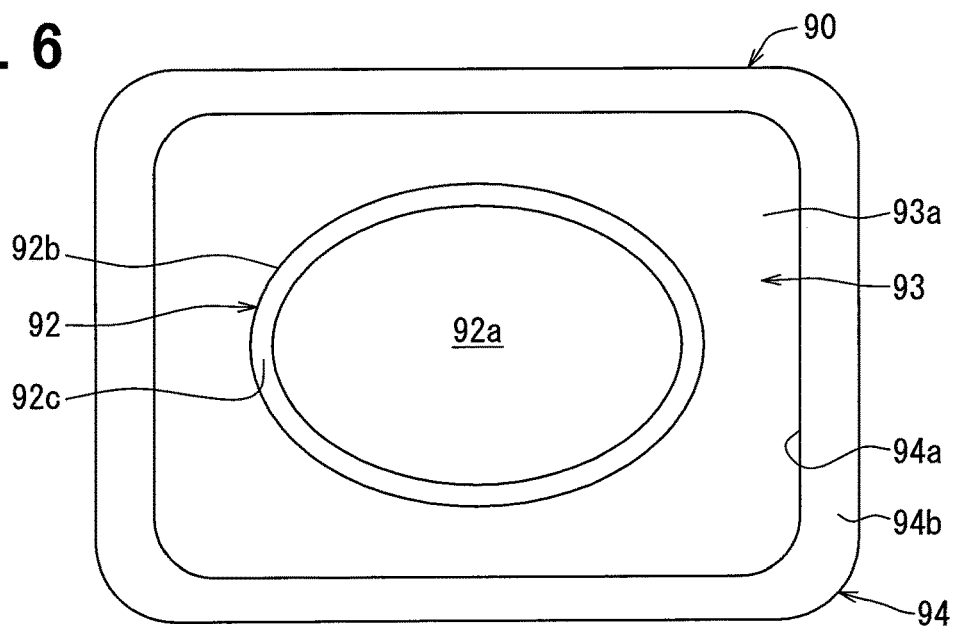
FIG. 6 is a drawing as viewed along the arrow VI of FIG. 5.

Next, the shape of the welding chip 90 will be explained in detail using FIG. 5, and FIG. 6.

The welding chip 90 includes a body part 91, a projected part 92, a first extension part 93, and a second extension part 94, and these portions are integrally formed by metal by subjecting the metal that becomes base metal to machining work. The body part 91 includes a heater storage chamber where the electric heater 90h is stored and the blowing passage, and receives a drive force generated by the moving device 80.

The projected part 92 has a bottomed tubular shape extending to the predetermined direction in a tubular shape with one end of the tubular shape opening and the other end being closed, and is pushed in to the welded parts 22, 32 to one side of the predetermined direction. In concrete terms, the projected part 92 has a cylindrical shape. As shown in FIG. 6, a tube end surface 92c positioned on the tube opening side of the projected part 92 has an elliptical shape extending perpendicularly to the predetermined direction and annularly. Also, as shown in FIG. 5, the inner surface of the tube of the projected part 92 has a curved shape in the vertical cross section, and a tube outer surface 92b that is the outside surface of the tube of the projected part 92 has a linear shape extending in the predetermined direction in the vertical cross section. As shown in FIG. 3, projected surfaces 22a, 32a of the welded parts 22, 32 in a state before welding has an elliptical shape as viewed from the predetermined direction. Also, as shown in FIG. 7, as viewed from the predetermined direction, the tube end surface 92c of the projected part 92 is set smaller than the projected surfaces 22a, 32a of the welded parts 22, 32, and the tube end surface 92c is positioned within the range of the projected surfaces 22a, 32a in the press moving mode.

The first extended part 93 has a plate shape expanding perpendicularly to the predetermined direction, and has a shape of extending outward in the radial direction of the projected part 92 from the tube outer surface 92b of the projected part 92 and extending in an annular shape around the tube axis of the projected part 92. The tube axis of the projected part 92 is an imaginary line extending in the predetermined direction described above at the cylinder center of the projected part 92. A plate inner surface 93a that is a surface positioned on the side of the welded parts 22, 32 out of the plate surfaces of the first extension part 93 is positioned on the other side of the predetermined direction (the upper side of FIG. 5) with respect to the tube end surface 92c.

The second extension part 94 has a cylindrical plate shape extending in the predetermined direction, and has a shape of extending to one side of the predetermined direction (the lower side of FIG. 5) from the extension end of the first extension part 93 and extending in an annular shape around the tube axis of the projected part 92. A tube inner surface 94a of the second extension part 94 is parallel to the predetermined direction. An extension distal end surface 94b that is the surface at the distal end extending in the predetermined direction out of the second extension part 94 is positioned on one side of the predetermined direction (the lower side of FIG. 5) with respect to the tube end surface 92c of the projected part 92. Also, as shown in FIG. 7, as viewed from the predetermined direction, the extension distal end surface 94b of the second extension part 94 is set larger than the projected surfaces 22a, 32a of the welded parts 22, 32, and the extension distal end surface 94b is positioned outside the range of the projected surfaces 22a, 32a in the press moving mode. Therefore, when the welding chip 90 is moved toward the welded parts 22, 32 by the press moving mode, the tube end surface 92c comes into contact with the projected surfaces 22a, 32a, and the tube inner surface 94a of the second extension part 94 is positioned so as to surround the periphery of the welded parts 22, 32.

Figure 7:
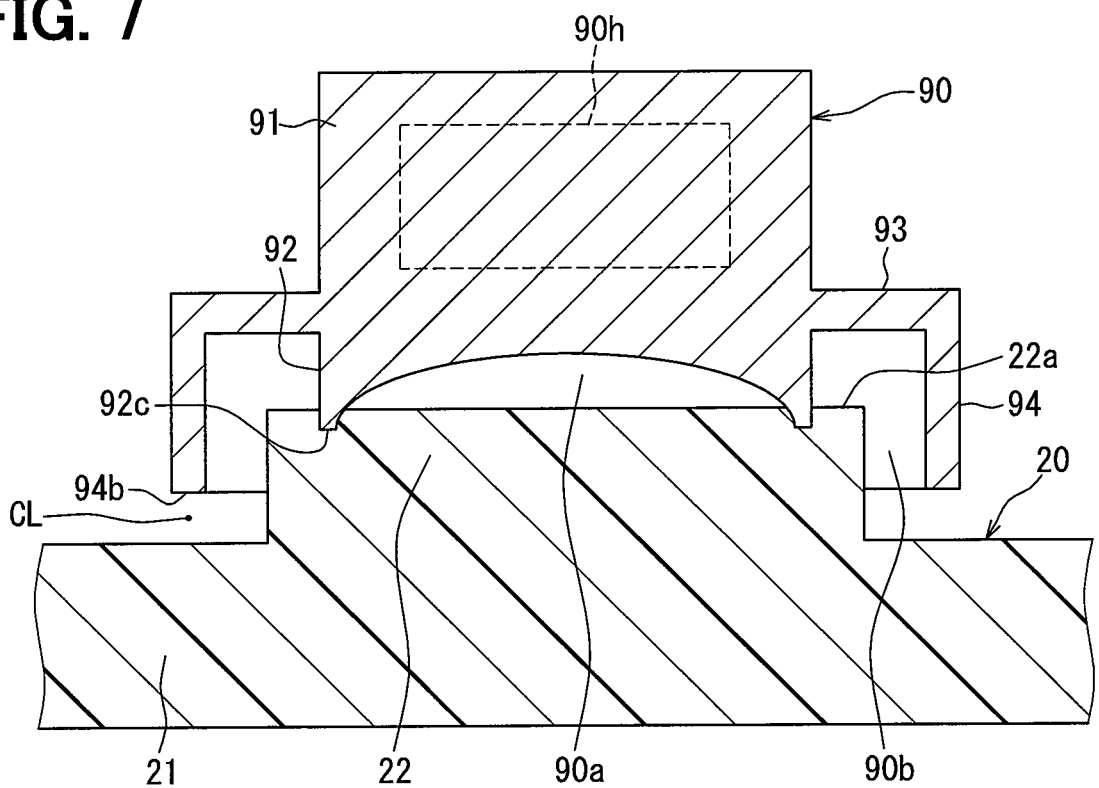
FIG. 7 is a cross-sectional view that shows a state in which the welding device shown in FIG. 5 has started pushing in of the welding chip to the welded part.

In a state in which the push-in amount of the welding chip 90 does not reach a predetermined stroke and the welding amount of the welded parts 22, 32 is less, as shown in FIG. 7, the second extension part 94 and the first extension part 93 do not come into contact with and are apart from the welded parts 22, 32 and the seats 21, 31. Thus, in a state of the middle of pushing-in shown in FIG. 7, a space is formed between a tube bottom surface 92a of the projected part 92 and the projected surfaces 22a, 32a of the welded parts 22, 32. The space positioned inside the projected part 92 thus is called an internal space 90a. Also, in the state of the middle of pushing-in described above, a space is formed between the tube outer surface 92b of the projected part 92, the plate inner surface 93a of the first extension part 93 and the tube inner surface 94a of the second extension part 94, and the welded parts 22, 32 and the seats 21, 31. The space positioned outside the projected part 92 thus is called an external space 90b.

Figure 8:
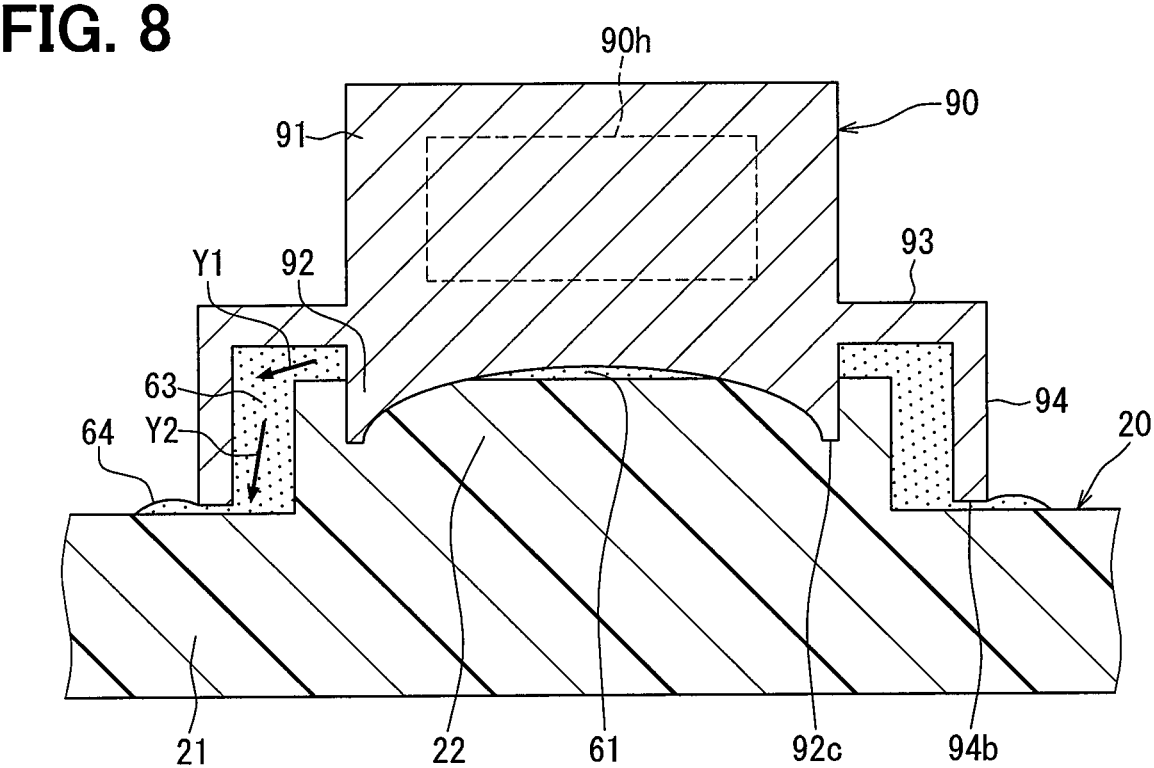
FIG. 8 is a cross-sectional view that shows a state in which the welding device shown in FIG. 5 melts the welded part.

FIG. 8 shows a state of the press retaining state and a state in which the welding chip 90 is pushed in to the welded parts 22, 32 by a predetermined amount. The welded parts 22, 32 are heated by the welding chip 90 and are partly molten. To be more specific, out of the welded parts 22, 32, portions including the projected surfaces 22a, 32a are molten. The halftone dot in the drawing shows a resin of a molten and plasticized state (will be hereinafter referred to as a molten resin). A molten resin 61 inside the tube of the projected part 92 is positioned in the internal space 90a, and a molten resin 63 outside the tube of the projected part 92 is positioned in the external space 90b.

In a state of the press moving mode shown in FIG. 7 and the press retaining mode shown in FIG. 8, the tube end surface 92c of the projected part 92 is in contact with the welded parts 22, 32 over the entire periphery. In this state, the internal space 90a is a space closed inside the tube of the projected part 92. As the welding chip 90 is moved to the pressing side, the volume of the internal space 90a reduces, and the amount of the molten resin 61 accumulated in the internal space 90a increases. Also, in a state of the press retaining mode shown in FIG. 8, the internal space 90a is filled with the molten resin 61.

Although the molten resin 63 positioned in the external space 90b outside the tube of the projected part 92 increases as it is moved to the side of pressing the welding chip 90, the molten resin 63 sharply increases in the movement when and after the internal space 90a is filled with the molten resin 61. In concrete terms, the molten resin 63 increases from a portion in contact with the tube outer surface 92b of the projected part 92 out of the welded parts 22, 32. Therefore, the increasing molten resin 63 flows outward in the radial direction from the tube outer surface 92b along the plate inner surface 93a of the first extension part 93 as shown by an arrow Y1 in FIG. 8. In other words, the molten resin 63 in the vicinity of the tube outer surface 92b moves outward in the radial direction while the upward movement is restricted by the first extension part 93.

The molten resin 63 having flowed outward in the radial direction thus along the first extension part 93 flows in the direction of approaching the seats 21, 31 along the tube inner surface 94a of the second extension part 94 as shown by an arrow Y2 in FIG. 8 when and after reaching the second extension part 94. In other words, the molten resin 63 having reached the second extension part 94 moves to the side of the seats 21, 31 while the movement outward in the radial direction is restricted by the second extension part 94.

The molten resin 63 having flowed to the side of the seats 21, 31 thus along the second extension part 94 flows out to outside the external space 90b from a clearance (CL) between the seats 21, 31 and the extension distal end surface 94b (refer to FIG. 7) when and after reaching the seats 21, 31. The molten resin having flowed out thus is called a resin outflow 64.

In short, in the press retaining mode shown in FIG. 8, the internal space 90a is filled with the molten resin 61, the external space 90b is filled with the molten resin 63, and the resin outflow 64 exists. When excitation of the electric heater 90h is stopped and the blower 81 is operated in this state, the temperature of the welding chip 90 drops, and the molten resins 61, 63 and the resin outflow 64 are cooled and solidified.

Figure 9:
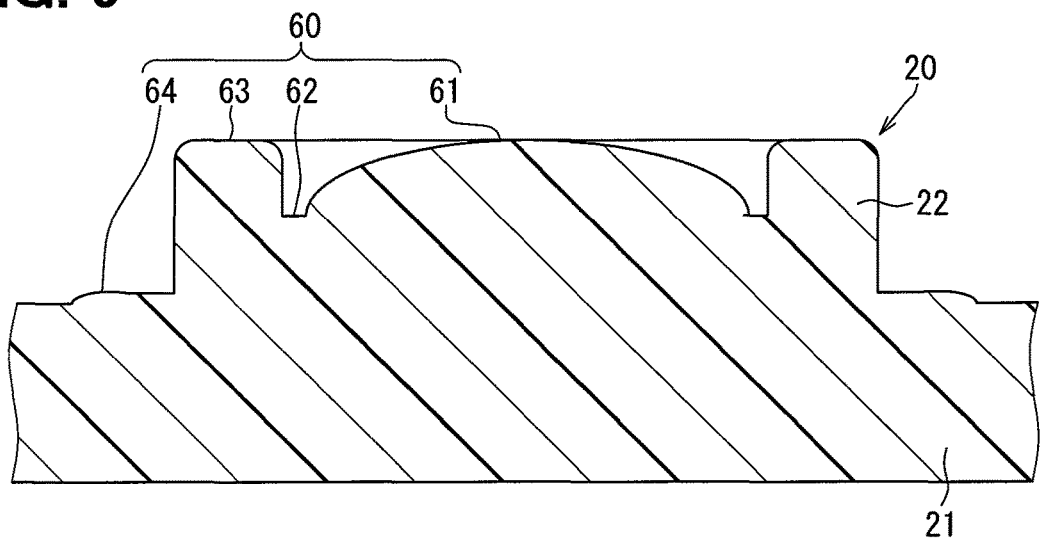
FIG. 9 is a cross-sectional view that shows a shape of the welded part after completion of welding, the welded part being in a state in which the welding chip shown in FIG. 8 has been removed.

After cooling and solidification, when the welding chip 90 is moved to the opposite side of the pressing direction and is removed from the welded parts 22, 32, the molten and solidified part 60 shown in FIG. 9 is formed. The molten and solidified part 60 includes the molten resins 61, 63 and the resin outflow 64 which have been cooled and solidified. The molten and solidified part 60 is a portion where the welded part 22 of the body 20 and the welded part 32 of the cover 30 are integrated, and the cover 30 is joined and fixed to the body 20 by formation of the molten and solidified part 60 having been integrated thus.

As shown in FIG. 9 and FIG. 4, a portion of the molten resin 61 out of the molten and solidified part 60 has a shape having a surface of the same shape as the tube bottom surface 92a namely a curved spherical surface. A portion of the molten resin 63 out of the molten and solidified part 60 has a cylindrical shape having a surface of the same shape as the tube outer surface 92b of the projected part 92, the plate inner surface 93a of the first extension part 93, and the tube inner surface 94a of the second extension part 94.

Also, the molten and solidified part 60 has a flat surface 62 having the same shaped as the tube end surface 92c of the projected part 92. This flat surface 62 has an annular shape adjacent to and between the two molten resins 61, 63. Also, a portion where the resin outflow 64 is cooled and solidified out of the molten and solidified part 60 has a shape extending in an annular shape along the periphery of the molten resin 63.

Figure 10:
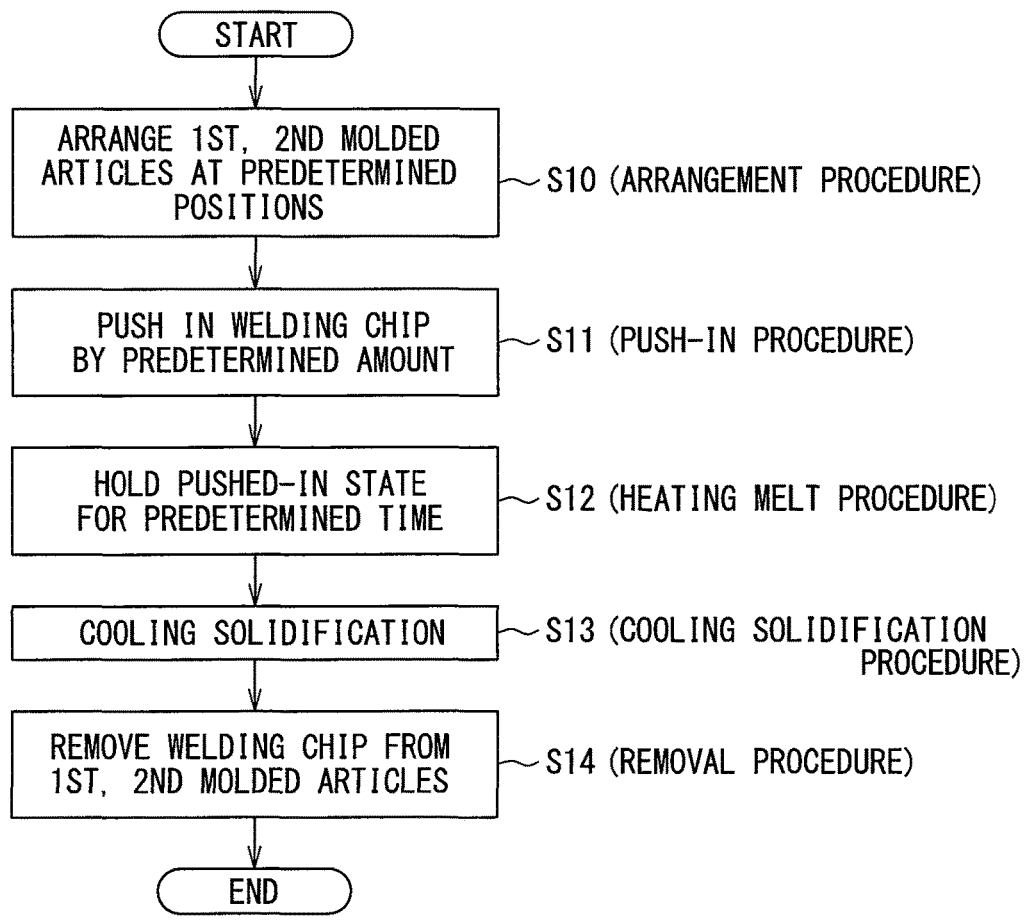
FIG. 10 is a flowchart that shows a procedure of the welding method related to the first embodiment.

FIG. 10 is a flowchart that shows a work procedure for joining the cover 30 to the body 20 by welding described above. First, in an arrangement procedure related to the step S10, the body 20 and the cover 30 are arranged so that the welded part 22 of the body 20 and the welded part 32 of the cover 30 are adjacent to each other. This arrangement may be manual work by a worker, or may be automatic arrangement by a robot not illustrated.

In a push-in procedure related to the step S11 to follow, the control device 82 controls operation of the moving device 80, and moves the welding chip 90 toward the welded parts 22, 32. Also, the projected part 92 of the welding chip 90 is pressed against the welded parts 22, 32. Further, by moving the welding chip 90 to one side of the predetermined direction by a portion of a predetermined stroke set beforehand, the welding chip 90 is pushed in to the welded parts 22, 32 by a predetermined amount. Furthermore, at the time point of starting this movement, such control by the control device 82 has been completed that excitation of the electric heater 90h is turned on and the temperature of the welding chip 90 is made a desired temperature.

Also, in the push-in procedure, the projected part 92 is pushed in to the welded parts 22, 32 by a predetermined amount while the extension distal end surface 94b of the second extension part 94 is not pushed in to the seats 21, 31. In other words, the extension length dimension of the second extension part 94 is set so that the extension distal end surface 94b is not pushed in to the seats 21, 31 in a state the welding chip 90 is pushed in to the welded parts 22, 32 by the predetermined amount. That is, the extension length dimension of the second extension part 94 is set so that the clearance CL is formed between the extension distal end surface 94b and the seats 21, 31 in a state the projected part 92 is pushed in to the welded parts 22, 32 by the predetermined amount when the molten resin 63 is less and the resin outflow 64 does not exist. Also, when the resin outflow 64 exists, there is a case that the extension distal end surface 94b comes into contact with the resin outflow 64 in a state the welding chip 90 is pushed in to the welded parts 22, 32 by a predetermined amount.

In the heating melt procedure related to the step S12 to follow, a state that the projected part 92 is pushed in to the welded parts 22, 32 by the predetermined amount and a state that the welded parts 22, 32 are heated and molten by the welding chip 90 are held for a predetermined time. In other words, the control device 82 moves the welding chip 90 at a predetermined speed by a predetermined stroke, and thereafter makes a state of stopping the movement and a state of turning on excitation of the electric heater 90h continue until a predetermined time elapses. Also, because of dispersion of the dimension such as the protrusion height of the welded parts 22, 32, there is dispersion in the amount of the resin outflow 64 for each product, and such case is also probable that the resin outflow 64 does not exist.

In the cooling solidification procedure related to the step S13 to follow, the control device 82 turns off excitation of the electric heater 90h and operates the blower 81 to cool the welding chip 90 in a state movement of the welding chip 90 is stopped. Thus, the welded parts 22, 32 are cooled and solidified.

In the removal procedure related to the following step S14, while keeping the state of stopping operation of the blower 81 and turning off excitation of the electric heater 90h, the welding chip 90 is moved to the other side of the predetermined direction namely to the side of departing from the welded parts 22, 32. Thus, the welding chip 90 is removed from the welded parts 22, 32 that are in a state of being cooled and solidified.

By the above, the welding chip 90 included in the welding device related to the present embodiment includes the projected part 92, the first extension part 93, and the second extension part 94. Also, the projected part 92 has a bottomed tubular shape of being pushed in to the welded parts 22, 32 in the predetermined direction from the tube opening side. The first extension part 93 has a shape of extending from the tube outer surface 92b of the projected part 92 and extending in an annular shape around the predetermined direction namely the tube center direction. The second extension part 94 has a shape of extending from the first extension part 93 to the opening side of the projected part 92 out of the predetermined direction namely the tube center direction, and extending in an annular shape around the predetermined direction.

Therefore, when the projected part 92 is pushed in to the welded parts 22, 32 from the tube opening side, the inside of the tube of the projected part 92 is filled with the molten resin 61. When the projected part 92 is pushed in further in this filled-in state, the molten resin 63 outside the tube sharply increases. Also the molten resin 63 outside the tube sharply increasing thus is restricted in the direction of sharply increasing and extending by the first extension part 93. As a result, the molten resin 63 sharply increasing and extending outside the tube comes to be pressed toward the seats 21, 31 by the first extension part 93, and can be suppressed from becoming a welding burr having a shape of floating from the body 20 and the cover 30.

Also, when the amount of the molten resin 63 outside the tube is much, it is concerned that the molten resin 63 moves along the first extension part 93 and runs off from the first extension part 93. With respect to this concern, according to the present embodiment, movement of the molten resin 63 outside the tube of the direction along the first extension part 93 is restricted by the second extension part 94, and movement toward the seats 21, 31 is promoted. Therefore, because the molten resin 63 outside the tube moving along the first extension part 93 is pressed to the seats 21, 31, the molten resin 63 outside the tube can be suppressed from becoming a welding burr having a shape of running off from the first extension part 93 and floating from the body 20 and the cover 30.

Also, the resin outflow 64 flowing out from the clearance CL flows in the radial direction as shown by the arrow Y1, the direction is thereafter changed to the flow toward the seats 21, 31 as shown by the arrow Y2. Therefore, compared to the case of flowing in the radial direction as shown by the arrow Y1 and flowing out as it is from the clearance CL, flowing out locally is suppressed. In other words, the resin outflow 64 is suppressed from extending locally in the peripheral direction of the second extension part 94 and coming to have a long shape. Therefore, formation of the welding burr having a shape of floating from the body 20 and the cover 30 can be suppressed.

By the above, because the welding device related to the present embodiment includes the welding chip 90 that includes the first extension part 93 and the second extension part 94, both of increase of the push-in amount of the welding chip 90 to improve the welding strength and suppression of peeling off of the welding burr can be achieved.

Further, in the present embodiment, as shown in FIG. 5 and FIG. 7, the extension distal end surface 94b of the second extension part 94 is positioned on the opposite side of the closed side of the projected part 92 with respect to the tube end surface 92c that is the end surface on the opening side of the projected part 92 in the predetermined direction. According to this arrangement, the extension length of the second extension part 94 (the length in the vertical direction in FIG. 8) becomes longer compared to the case the extension distal end surface 94b is positioned on the closed side of the projected part 92 with respect to the tube end surface 92c.

In the meantime, it is described above that the resin outflow 64 flowing out from the clearance CL flows in the radial direction as shown by the arrow Y1 in FIG. 8 and the direction is thereafter changed to the flow toward the seats 21, as shown by the arrow Y2. Therefore, according to the present embodiment in which the extension length of the second extension part 94 becomes long as described above, the direction of the flow to the radial direction can be positively changed to the flow to the seats 21, 31. Accordingly, the resin outflow 64 can be further suppressed from extending locally in the peripheral direction of the second extension part 94 to have a long shape.

Furthermore, because the extension length of the second extension part 94 is long, the volume of the external space 90*b* can be increased and the resin outflow 64 can be reduced without enlarging the first extension part 93. Therefore, the resin outflow 64 can be reduced and the welding burr can be made small while preventing the welding chip 90 from becoming large in the radial direction. Also, because the extension length of the second extension part 94 becomes long, the area for heating the molten resin 63 becomes large. Therefore, because the temperature rise of the molten resin 63 can be made quick while preventing the welding chip 90 from becoming large in the radial direction, the time taken for welding can be shortened.

Also, according to the present embodiment, in the push-in procedure by the step S11 of FIG. 10, the projected part 92 is pushed in to the welded parts 22, 32 by a predetermined amount while preventing the extension distal end surface 94*b* of the second extension part 94 from being pushed in to the seats 21, 31. Therefore, the heat transfer amount from the extension distal end surface 94*b* of the second extension part 94 to the seats 21, 31 can be reduced. Accordingly, such risk can be reduced that a portion of the body part of the body 20 and the cover 30 and adjacent to the seats 21, 31 is molten by the heat transferred from the seats 21, 31.

Also, according to the present embodiment, it is not configured that the welded parts 22, 32 are formed directly in the body part described above of the body 20 and the cover 30, but the welded parts 22, 32 are formed on the seats 21, 31 which protrude from the body part. Therefore, the heat transfer amount of the body 20 and the cover 30 to the body part can be reduced, and the risk that the body part described above is molten by the heat can be reduced.

Second Embodiment

Figure 11:
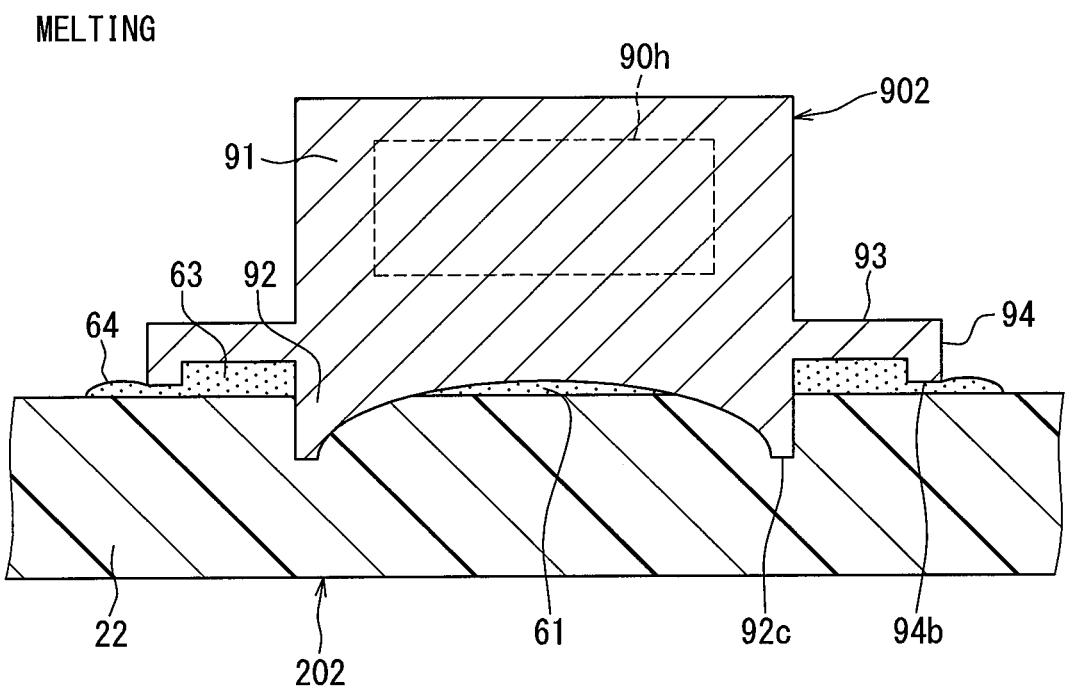
FIG. 11 is a cross-sectional view that schematically shows the welding device and the first welded part related to a second embodiment.

According to the first embodiment described above, the seats 21, 31 are formed in the body 20 and the cover 30, and the welded parts 22, 32 are formed on these seats 21, 31. On the other hand, according to the present embodiment, these seats 21, 31 are taken off, and the welded part 22 is directly formed in the body part of a body 202 as shown in FIG. 11. Further, with respect also to the cover not illustrated in FIG. 11, the welded part 32 is directly formed in the body part similarly to the body 202.

Figure 12:
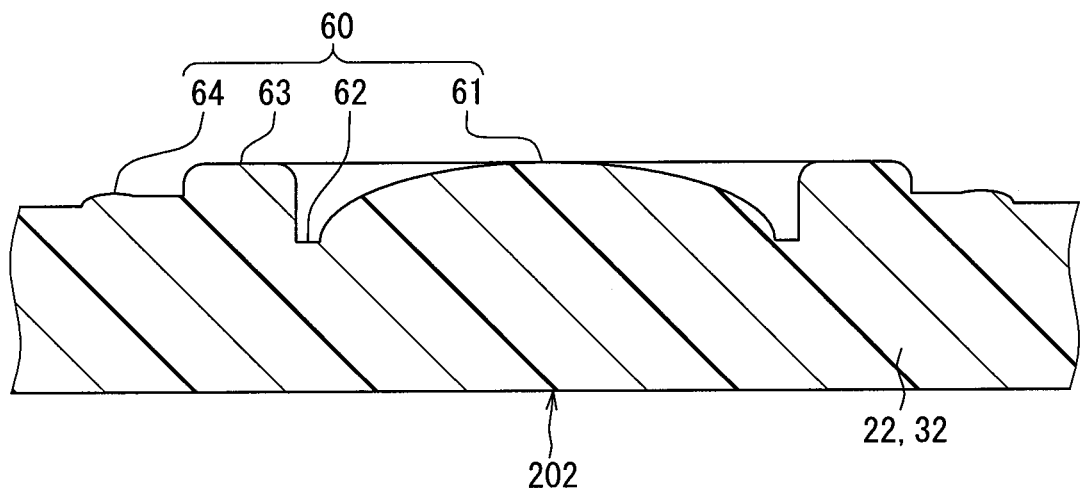
FIG. 12 is a cross-sectional view that shows a shape of the welded part after completion of welding, the welded part being in a state in which the welding chip shown in FIG. 11 has been removed.

Accordingly, the molten and solidified part 60 related to the first embodiment is formed in the seats 21, 31 and the welded parts 22, 32. On the other hand, the molten and solidified part 60 related to the present embodiment is formed in the body part and the welded parts 22, 32 of the body 202 and the cover as shown in FIG. 12.

Also, the extension distal end surface 94*b* of the welding chip 90 related to the first embodiment is positioned below the tube end surface 92*c*, whereas the extension distal end surface 94*b* of a welding chip 902 related to the present embodiment is positioned above the tube end surface 92*c*. In other words, the extension distal end surface 94*b* is positioned on the side of the first extension part 93 with respect to the tube end surface 92*c*. With respect to points other than this point, the welding device related to the present embodiment has the same construction as the welding device related to the first embodiment, and the welding method is also same.

From the above, even in the present embodiment in which the seats 21, 31 are taken off, the welding device including the welding chip 902 having the first extension part 93 and the second extension part 94 can be applied similarly to the first embodiment, and similar effects are exerted.

Third Embodiment

Figure 13:
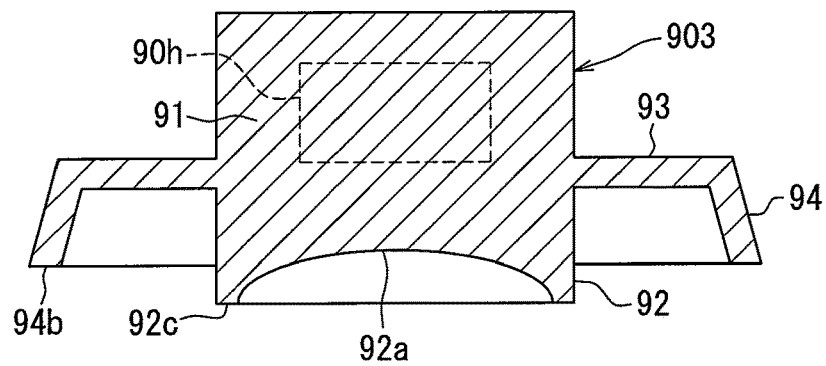
FIG. 13 is a cross-sectional view that schematically shows a shape of the welding chip in the welding device related to a third embodiment.

In the welding chip 90 related to the first embodiment described above, the direction along which the second extension part 94 extends from the first extension part 93 is parallel to the moving direction of the welding chip 90. On the other hand, in a welding chip 903 of the present embodiment shown in FIG. 13, the direction along which the second extension part 94 extends from the first extension part 93 is a direction crossing the moving direction of the welding chip 903. In other words, the second extension part 94 has a shape widened toward the end in which the tube opening area in the cross section perpendicular to the tube axis out of the second extension part 94 increases as it departs from the first extension part 93.

Also, with respect to points other than the point of the shape widened toward the end described above, the welding device related to the present embodiment has the same configuration as the welding device related to the first embodiment, and the welding method is also same. Further, in the present embodiment also in which the second extension part 94 has a shape widened toward the end, effects similar to those of the first embodiment are exerted.

Fourth Embodiment

Figure 14:
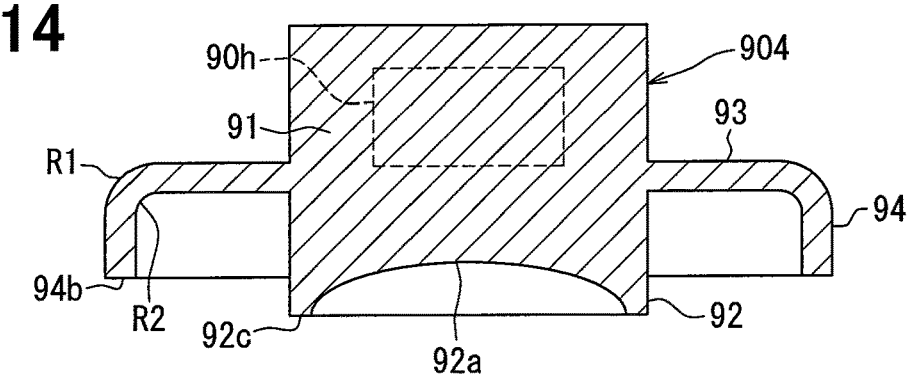
FIG. 14 is a cross-sectional view that schematically shows a shape of the welding chip in the welding device related to a fourth embodiment.

In the welding chip 90 related to the first embodiment described above, the connection portion of the first extension part 93 and the second extension part 94 is formed to be the right angle, and the shape of the cross section of the combination of the first extension part 93 and the second extension part 94 is an L-shape. On the other hand, in a welding chip 904 of the present embodiment shown in FIG. 14, the connection portion of the first extension part 93 and the second extension part 94 is of a curved shape having curved surfaces R1, R2.

Also, with respect to points other than the point of the curved shape described above, the welding device related to the present embodiment has the same configuration as the welding device related to the first embodiment, and the welding method is also same. Further, in the present embodiment also in which the connection portion of the first extension part 93 and the second extension part 94 has the curved shape, effects similar to those of the first embodiment are exerted.

Fifth Embodiment

Figure 15:
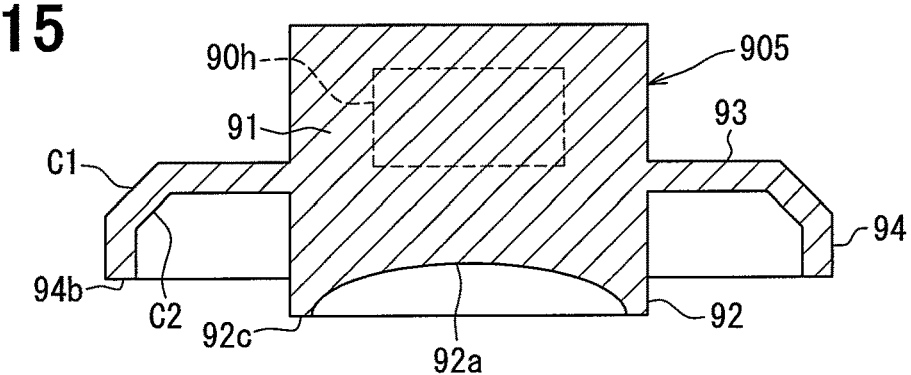
FIG. 15 is a cross-sectional view that schematically shows a shape of the welding chip in the welding device related to a fifth embodiment.

In the welding chip 90 related to the first embodiment described above, the connection portion of the first extension part 93 and the second extension part 94 is formed to be the right angle, and the connection portion has the curved shape in the fourth embodiment described above. On the other hand, in a welding chip 905 of the present embodiment shown in FIG. 15, the connection portion of the first extension part 93 and the second extension part 94 is of a tapered shape having tapered surfaces C1, C2.

Also, with respect to points other than the point of the tapered shape described above, the welding device related to the present embodiment has the same configuration as the welding device related to the first embodiment, and the welding method is also same. Further, in the present embodiment also in which the connection portion of the first extension part 93 and the second extension part 94 has the tapered shape, effects similar to those of the first embodiment are exerted.

Sixth Embodiment

Figure 16:
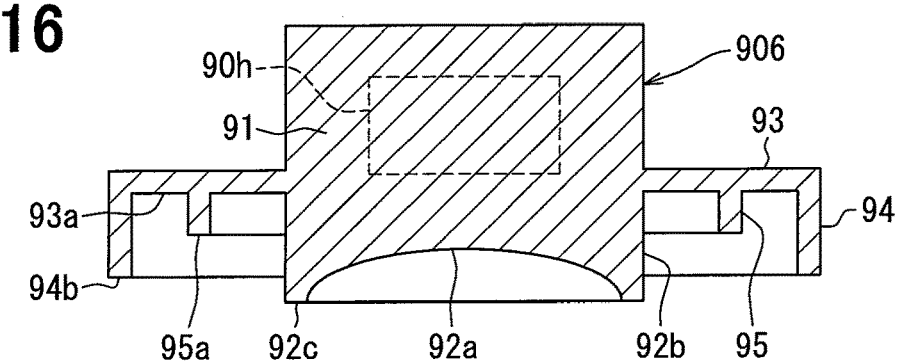
FIG. 16 is a cross-sectional view that schematically shows a shape of the welding chip in the welding device related to a sixth embodiment.
Figure 17:
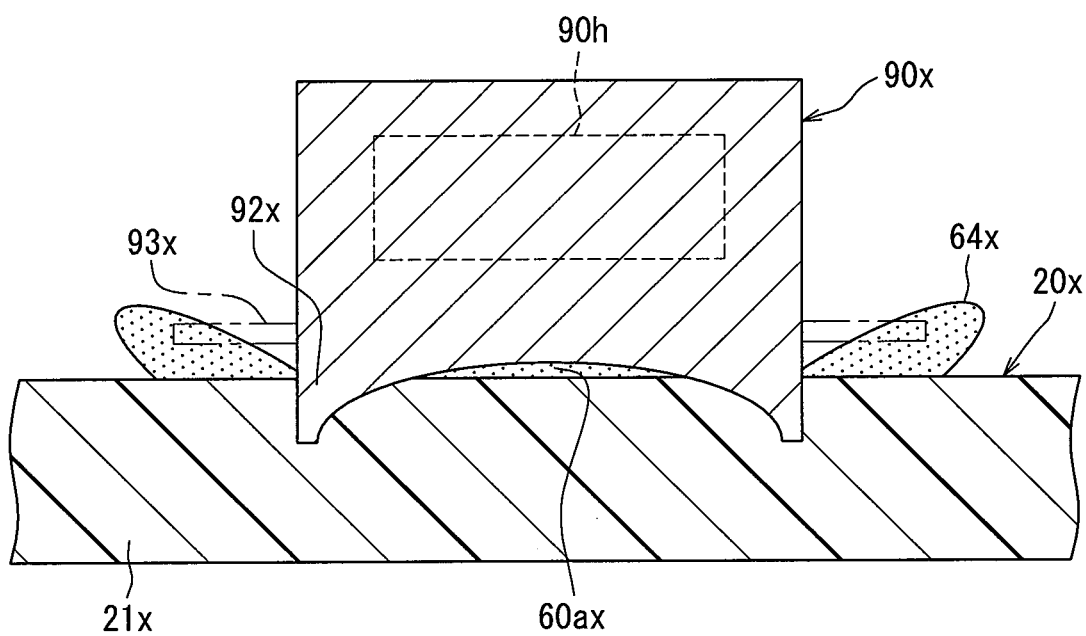
FIG. 17 is a cross-sectional view that shows a state in which a resin molded article is heated and molten using a welding chip as a comparative example on which the present inventors studied.

A welding chip 906 related to the present embodiment shown in FIG. 16 includes a third extension part 95 in addition to the second extension part 94. The third extension part 95 has a tubular shape of extending to the side of the tubular end surface 92c from the plate inner surface 93a of the first extension part 93. The extension direction of the third extension part 95 is parallel to the second extension part 94. The extension length of the third extension part 95 is set shorter than the extension length of the second extension part 94. In other words, in the predetermined direction of pressing the welding chip 906, an extension end surface 95a of the third extension part 95 is positioned on the side of the first extension part 93 with respect to the extension distal end surface 94b of the second extension part 94.

Also, with respect to points other than the point of having the third extension part 95 as described above, the welding device related to the present embodiment has the same configuration as the welding device related to the first embodiment, and the welding method is also same. Further, in the present embodiment also including the third extension part 95, effects similar to those of the first embodiment are exerted.

In addition, because the present embodiment includes the third extension part 95, the effect described below is also exerted. It is already described that, as shown by the arrow Y1 in FIG. 8, the molten resin 63 in the vicinity of the tube outer surface 92b moves outward in the radial direction while upward movement is restricted by the first extension part 93. However, in the present embodiment, because the third extension part 95 is included, movement of the molten resin 63 outward in the radial direction comes to be suppressed by the third extension part 95. Therefore, the flow in the direction of approaching the seats 21, 31 along the tube inner surface 94a of the second extension part 94 as shown by the arrow Y2 in FIG. 8 can be further promoted. Accordingly, the resin outflow 64 can be further suppressed from extending locally to become a long shape in the peripheral direction of the second extension part 94.

Although the embodiments have been explained above, the present disclosure is not limited to the embodiments described above by any means, and implementations with various modifications as exemplified below are possible. Not only the combination of the portions on which it is specified that combination is possible in concrete terms in each embodiment but also partial combination of the embodiments is possible even if it is not specified when such combination does not cause any disadvantage particularly. Modifications of the embodiments described above will be described.

In the second embodiment described above, the seats 21, 31 are taken off, and the welded parts 22, 32 are protruded from the body 202 and the cover. On the other hand, it is also possible to have a shape of not protruding the welded parts while taking off the seats 21, 31.

The projected part 92 related to each embodiment described above has the cylindrical shape as shown in FIG. 5 and FIG. 6. On the other hand, a polygonal tube shape is also possible.

The electric heater 90h is attached to the welding chip 90 related to each embodiment described above. On the other hand, it is also possible that the welding chip 90 is taken off, a heat generation body that generates heat by electric resistance is employed as a welding chip, and that it is configured to make electric current flow through the welding chip and to make the welding chip itself generate heat.

Although the cover 30 shown in FIG. 1 has a bottomed cylindrical shape, the cover 30 may have a cylindrical shape without the bottom. Also, the shape of the cover 30 is not limited to a cylindrical shape, and only has to be a shape of covering the float 40.

In each embodiment described above, the welding device and the welding method are applied to the liquid surface detection device D for a lubrication oil mounted on a vehicle. On the other hand, the welding device and the welding method may be applied to a liquid surface detection device for fuel within a fuel tank mounted on a vehicle. Also, the welding device and the welding method may be applied to welding of a resin molded article used for an on-vehicle device other than the liquid surface detection device. Further, the welding device and the welding method may be applied to welding of a resin molded article other than an on-vehicle device.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

What is claimed is:

1. A welding device for joining together a first molded article made of resin and a second molded article made of resin by welding, wherein
the first molded article includes:
a first seat portion outwardly protruding from a first outer surface of the first molded article in a first protruding direction perpendicular to the first outer surface;
a first welded part outwardly protruding from a first protruding end surface of the first seat portion in the first protruding direction; and
a first side surface extending from a side end of the first outer surface in a direction opposite to the first protruding direction,
wherein a surface area of a first projected surface of the first welded part is smaller than that of the first seat portion,
the second molded article includes:
a second seat portion outwardly protruding from a second outer surface of the second molded article in a second protruding direction perpendicular to the second outer surface;
a second welded part outwardly protruding from a second protruding end surface of the second seat portion in the second protruding direction; and
a second side surface extending from a side end of the second outer surface in a direction opposite to the second protruding direction,
wherein a surface area of a second projected surface of the second welded part is smaller than that of the second seat portion,
wherein the first side surface and the second side surface are in a surface-to-surface contact with each other in a surface contact direction, which is perpendicular to each of the first and the second protruding directions, wherein the first protruding direction and the second protruding direction are parallel to each other in a condition that the first molded article and the second molded article are in contact with each other at the first and the second side surfaces, wherein the first side surface of the first seat portion is in the surface-to-surface contact with the second side surface of the second seat portion, and wherein the first side surface of the first welded part is in the surface-to-surface contact with the second side surface of the second welded part, the welding device comprises a welding chip that concurrently comes into contact with both the projected surface of the first welded part of the first molded article and the projected surface of the second welded part of the second molded article, wherein the welding chip heats and melts the first welded part and the second welded part, and includes:

a projected part that has a tubular shape with a bottom, wherein:

one end of the tubular shape extending in a predetermined direction opens and the other end of the tubular shape is closed; and the projected part is pushed into the first welded part and the second welded part in the predetermined direction from the opening one end of the tubular shape;

a first extension part that has a shape extending from a tube outer surface of the projected part and extending annularly around the predetermined direction, wherein an outer periphery of the first extension part is located at an outer side of an outer periphery of the first and the second welded parts when viewed in the predetermined direction; and a second extension part that has a shape extending from the outer periphery of the first extension part to the opening one end of the projected part in the predetermined direction and extending annularly around the predetermined direction, wherein a length of the second extension part is larger than that of the projected part in the predetermined direction, so that an extension distal end surface of the second extension part is located at a position which is more away from a tube end surface of the projected part in the predetermined direction and which is separated from the first and the second protruding end surfaces.

2. A welding method for joining together by welding a first molded article made of resin and a second molded article made of resin by heating and melting both a part of the first molded article and a part of the second molded article by a welding chip, wherein:

the first molded article includes:

a first seat portion outwardly protruding from a first outer surface of the first molded article in a first protruding direction perpendicular to the first outer surface;

a first welded part outwardly protruding from a first protruding end surface of the first seat portion in the first protruding direction; and a first side surface extending from a side end of the first outer surface in a direction opposite to the first protruding direction, wherein a surface area of a first projected surface of the first welded part is smaller than that of the first seat portion, the second molded article includes:

a second seat portion outwardly protruding from a second outer surface of the second molded article in a second protruding direction perpendicular to the second outer surface;

a second welded part outwardly protruding from a second protruding end surface of the second seat portion in the second protruding direction; and a second side surface extending from a side end of the second outer surface in a direction opposite to the second protruding direction, wherein a surface area of a second projected surface of the second welded part is smaller than that of the second seat portion, wherein the first side surface and the second side surface are in a surface-to-surface contact with each other in a surface contact direction, which is perpendicular to each of the first and the second protruding directions, wherein the first protruding direction and the second protruding direction are parallel to each other in a condition that the first molded article and the second molded article are in contact with each other at the first and the second side surfaces, wherein the first side surface of the first seat portion is in the surface-to-surface contact with the second side surface of the second seat portion, and wherein the first side surface of the first welded part is in the surface-to-surface contact with the second side surface of the second welded part, the welding chip includes:

a projected part that has a tubular shape with a bottom, wherein one end of the tubular shape extending in a predetermined direction opens and the other end of the tubular shape is closed;

a first extension part that has a shape extending from a tube outer surface of the projected part and extending annularly around the predetermined direction, wherein an outer periphery of the first extension part is located at an outer side of an outer periphery of the first and the second welded parts when viewed in the predetermined direction; and a second extension part that has a shape extending from the first extension part to the opening one end of the projected part in the predetermined direction and extending annularly around the predetermined direction, the welding method comprises:

performing an arrangement procedure, in which the first molded article and the second molded article are arranged so that the first welded part and the second welded part are in the surface-to-surface contact with each other;

performing a push-in procedure, in which the projected part is pushed into the first welded part and the second welded part in the predetermined direction from the opening one end of the tubular shape after the arrangement procedure, wherein the welding chip is moved in the predetermined direction by a maximum stroke amount to form a clearance between an extension distal end surface of the second extension part and the first and the second outer surfaces of the first and the second molded articles in the predetermined direction;

performing a heating melt procedure, in which a state where the projected part is pushed in by the maximum stroke amount, and a state where the first welded part and the second welded part are heated and molten by the welding chip are maintained for a predetermined time; and performing a cooling solidification procedure, in which the first welded part and the second welded part are cooled and solidified after the heating melt procedure.

3. A welding method for joining together by welding a first molded article made of resin and a second molded article made of resin by heating and melting both a part of the first molded article and a part of the second molded article by a welding chip, wherein:

the first molded article includes;

a first outer surface;

a first welded part outwardly protruding from the first outer surface in a first protruding direction perpendicular to the first outer surface; and a first side surface extending from a side end of the first outer surface in a direction opposite to the first protruding direction, the second molded article includes;

a second outer surface;

a second welded part outwardly protruding from the second outer surface in a second protruding direction perpendicular to the second outer surface; and a second side surface extending from a side end of the second outer surface in a direction opposite to the second protruding direction, wherein the first side surface and the second side surface are in a surface-to-surface contact with each other in a surface contact direction, which is perpendicular to each of the first and the second protruding directions, wherein the first protruding direction and the second protruding direction are parallel to each other in a condition that the first molded article and the second molded article are in contact with each other at the first and the second side surfaces, and wherein the first side surface of the first welded part is in the surface-to-surface contact with the second side surface of the second welded part, the welding chip includes:

a projected part that has a tubular shape with a bottom, wherein one end of the tubular shape extending in a predetermined direction opens and the other end of the tubular shape is closed;

a first extension part that has a shape extending from a tube outer surface of the projected part and extending annularly around the predetermined direction; and a second extension part that has a shape extending from the first extension part to the opening one end of the projected part in the predetermined direction and extending annularly around the predetermined direction, and the welding method comprises:

performing an arrangement procedure, in which the first molded article and the second molded article are arranged so that the first welded part and the second welded part are in the surface-to-surface contact with each other;

performing a push-in procedure, in which the projected part is pushed into the first welded part and the second welded part in the predetermined direction from the opening one end of the tubular shape after the arrangement procedure, wherein the welding chip is moved in the predetermined direction by a maximum stroke amount to form a clearance between an extension distal end surface of the second extension part and the first and the second outer surfaces of the first and the second molded articles in the predetermined direction;

performing a heating melt procedure, in which a state where the projected part is pushed in by the maximum stroke amount, and a state where the first welded part and the second welded part are heated and molten by the welding chip are maintained for a predetermined time; and performing a cooling solidification procedure, in which the first welded part and the second welded part are cooled and solidified after the heating melt procedure.

\* \* \* \* \*